(12) United States Patent
Yasuda et al.

(10) Patent No.: US 11,453,085 B2
(45) Date of Patent: Sep. 27, 2022

(54) METHOD FOR MANUFACTURING JOINED BODY

(71) Applicant: FUTABA INDUSTRIAL CO., LTD., Okazaki (JP)

(72) Inventors: Keigo Yasuda, Okazaki (JP); Koji Yamaguchi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 332 days.

(21) Appl. No.: 16/802,105

(22) Filed: Feb. 26, 2020

(65) Prior Publication Data

US 2020/0290153 A1   Sep. 17, 2020

(30) Foreign Application Priority Data

Mar. 13, 2019   (JP) .............................. JP2019-045944

(51) Int. Cl.
*B23K 26/242* (2014.01)
*B23K 26/06* (2014.01)
*B23K 26/064* (2014.01)

(52) U.S. Cl.
CPC ............ *B23K 26/242* (2015.10); *B23K 26/06* (2013.01); *B23K 26/064* (2015.10)

(58) Field of Classification Search
CPC ..... B23K 26/06; B23K 26/064; B23K 26/242
See application file for complete search history.

(56) References Cited

U.S. PATENT DOCUMENTS

| 2015/0083697 A1* | 3/2015 | Roos .................... B23K 26/082 |
| | | 219/121.61 |
| 2015/0183058 A1 | 7/2015 | Sugiyama et al. |
| 2016/0361782 A1* | 12/2016 | Saito .................... B23K 26/06 |

(Continued)

FOREIGN PATENT DOCUMENTS

| CN | 104364044 A | * | 2/2015 | ............. B23K 26/32 |
| CN | 104364044 A | | 2/2015 | |

(Continued)

OTHER PUBLICATIONS

Notice of the First Patent Examination Opinion for Chinese Patent Application No. 20201011497.2, dated Jul. 15, 2021, 16 pages.

(Continued)

*Primary Examiner* — Dana Ross
*Assistant Examiner* — Kuangyue Chen
(74) *Attorney, Agent, or Firm* — Withrow & Terranova, P.L.L.C.; Vincent K. Gustafson

(57) ABSTRACT

Firstly, an upper base material is disposed above a lower base material. Secondly, a laser beam is irradiated so that an area irradiated with a laser beam at a time of melting start is formed on only an upper surface of the upper base material or on only both the upper surface and an end surface of the upper base material, whereby the end surface of the upper base material and the lower base material are fillet welded. With the end surface as a reference, a side the upper surface and the lower surface are positioned is a first side, and an opposite side of the first side is a second side. The laser beam is set such that an intensity of the laser beam is lower toward the second side from the first peak area within the irradiation area of the laser beam.

20 Claims, 4 Drawing Sheets

(56) References Cited

U.S. PATENT DOCUMENTS

2017/0036302 A1* 2/2017 Okuda ............... B23K 26/1464
2017/0297145 A1* 10/2017 Hosomi ............... B23K 26/242
2018/0093346 A1* 4/2018 Yamagishi ........ B29C 66/73921
2019/0039175 A1 2/2019 Schnick et al.
2019/0308271 A1* 10/2019 Hioki ................... B23K 26/242
2019/0381601 A1* 12/2019 Matsuo ............... B23K 26/082

FOREIGN PATENT DOCUMENTS

| JP | H04187391 A * | 7/1992 |
| JP | H04187391 A | 7/1992 |
| JP | 2004174570 A * | 6/2004 |
| JP | 2004174570 A | 6/2004 |
| JP | 5292921 B2 | 9/2013 |
| JP | WO2013186862 A1 | 2/2016 |
| JP | 2017173371 A | 9/2017 |
| JP | 6318797 B2 | 5/2018 |
| JP | 2019504770 A | 2/2019 |

OTHER PUBLICATIONS

Notice of Reasons for Refusal for Japanese Patent Application No. 2019045944, dated Jun. 8, 2021, 6 pages.
Notice of the First Patent Examination Opinion for Chinese Patent Application No. 202010151497.2 dated Jul. 15, 2021, 16 pages.
Notice of Reasons for Refusal for Japanese Patent Application No. 2019-045944, dated Feb. 9, 2021, 10 pages.

* cited by examiner

METHOD FOR MANUFACTURING JOINED BODY

CROSS-REFERENCE TO RELATED APPLICATIONS

The present application claims the benefit of Japanese Patent Application No. 2019-45944 filed on Mar. 13, 2019 with the Japan Patent Office, the entire disclosure of which is incorporated herein by reference.

BACKGROUND

The present disclosure relates to a method for manufacturing a joined body through the laser welding.

There have been various methods proposed for joining materials made of metal by laser welding. For example, in a laser welding method disclosed in U.S. Pat. No. 6,318,797 in Patent Gazette, a fillet welding is performed for two metal plates vertically stacked with an interspace therebetween. In laser welding method thereof, conditions for the laser welding are set so as to form a specified angle between a portion of a welding joint, which faces the interspace, formed of a molten metal because of the laser welding and a metal plate on a lower side.

SUMMARY

However, in the laser welding method disclosed in U.S. Pat. No. 6,318,797 in Patent Gazette, while the metal plates on both upper and lower sides are irradiated with a laser beam, an intensity of laser beam irradiated to the metal plate on the upper side is higher than that to the metal plate on the lower side. Accordingly, there is a risk that the intensity of laser beam irradiated to an edge of the metal plate on the upper side is so high that the edge of the metal plate on the upper side is drastically burned through. In such a case, a throat depth of the welding joint is decreased and the welding strength is correspondingly lowered.

According to one aspect of the present disclosure, it is preferable to increase welding strength.

One aspect of the present disclosure is a method for manufacturing a joined body by joining an upper base material and a lower base material through a laser welding. The upper base material comprises an upper surface, a lower surface and an end surface. The lower surface is positioned on an opposite side from the upper surface. The end surface is positioned between an edge of the upper surface and an edge of the lower surface. The manufacturing method hereof comprises disposing the upper base material above the lower base material in such a manner that the lower surface of the upper base material faces the lower base material, and, the end surface of the upper base material is elongated along the lower base material. The method comprises irradiating a laser beam so as to form an initial irradiation area on only the upper surface of the upper base material or on only both the upper surface and the end surface of the upper base material, whereby the end surface of the upper base material and the lower base material are fillet welded. The initial irradiation area is an area irradiated with the laser beam at a time of melting start because of the fillet welding. Here, with the end surface as a reference, a side where the upper surface and the lower surface are positioned is a first side, and an opposite side of the first side is a second side. Also, a direction the upper surface and the lower surface of the upper base material are opposing is a reference direction. An irradiation direction of the laser beam is inclined relative to the reference direction so that the laser beam travels toward the first side as the laser beam approaches the upper base material. Further, the laser beam is set in such a manner that a first peak area on which the intensity of the laser beam irradiated is the highest among the irradiation area of the laser beam is formed, and that the intensity of the laser beam is lower toward the second side from the first peak area within the irradiation area of the laser beam.

The aforementioned configuration allows an irradiation of the laser beam to only the upper surface of the upper base material, or to only both the upper surface and the end surface of the upper base material when the upper base material starts melting because of the fillet welding. Within the irradiation area of the laser beam, the intensity of the laser beam is lower toward the second side from the first peak area. Consequently, the intensity of laser beam irradiated to or near the end surface of the upper base material can be suppressed, and therefore the area near the end surface of the upper base material can be gradually molten. As a result, the upper base material is suitably burned through and the throat depth of the welding joint is increased. Accordingly, the welding strength is improved.

According to one aspect of the present disclosure, the laser beam may be further set in such a manner that the intensity of the laser beam is lower toward the first side from the first peak area within the irradiation area of the laser beam.

This configuration allows a gradual melting of a part of the upper base material located on the first side of the first peak area within the irradiation area of the laser beam, and therefore the aforementioned part is suitably burned through. As a result, the throat depth of the welding joint is increased and the welding strength is improved.

In one aspect of the present disclosure, the first peak area of the laser beam may be positioned on the upper surface of the upper base material.

In another aspect of the present disclosure, the first peak area of the laser beam may be positioned at a boundary between the upper surface and the end surface.

The aforementioned configuration allows a suitable suppression of the intensity of laser beam irradiated to or near the end surface of the upper base material, whereby the area near the end surface of the upper base material is more gradually molten. As a result, the upper base material is suitably burned through and the throat depth of the welding joint is increased and therefore the welding strength is improved.

In one aspect of the present disclosure, the first peak area of the laser beam may be formed substantially in the middle between an end of the first side and an end of the second side within the irradiation area of the laser beam.

This configuration allows a proper control of the laser beam intensity.

In one aspect of the present disclosure, the upper base material may be arranged with an interspace between itself and the lower base material.

This configuration allows a proper performance of the welding.

In one aspect of the present disclosure, the upper base material may be a plate-shaped member.

This configuration allows a proper performance of the welding.

According to one aspect of the present disclosure, the laser beam may be set in such a manner that at least one second peak area is formed on the first side and/or the second side of the first peak area within the irradiation area of the laser beam. The second peak area is an area in which the intensity of the laser beam is locally high and may be lower than that in the first peak area.

The aforementioned configuration allows a more suitable adjustment of the intensity of the laser beam at a part of the upper base material located on the first side and/or the second side of the first peak area within the irradiation area of the laser beam. As a result, the upper base material is more suitably molten, and the throat depth of the welding joint is increased.

In one aspect of the present disclosure, the initial irradiation area of the laser beam may be formed at an area near a boundary between the upper surface and the end surface of the upper base material.

This configuration allows a gradual melting of the area near the end surface of the upper base material and an increase in amount of the molten upper base material. Accordingly, the throat depth of the welding joint is increased and the welding strength is improved.

According to one aspect of the present disclosure, the fillet welding may be performed by displacing the irradiation area of the laser beam along a path extending in a substantially straight manner.

This configuration further simplifies a configuration of an equipment for performing a laser welding. It also simplifies a process of performing the laser welding, whereby a work efficiency is improved.

BRIEF DESCRIPTION OF THE DRAWINGS

Embodiments of the present disclosure will be described hereinafter with reference to the accompanying drawings, in which.

DETAILED DESCRIPTION OF EXEMPLARY EMBODIMENTS

It is to be understood that although some embodiments of the present disclosure have been described above, the present disclosure is not limited to the embodiments below, but may be implemented in various forms within the technical scope of the present disclosure.

1. Laser Welder

Figure 1:
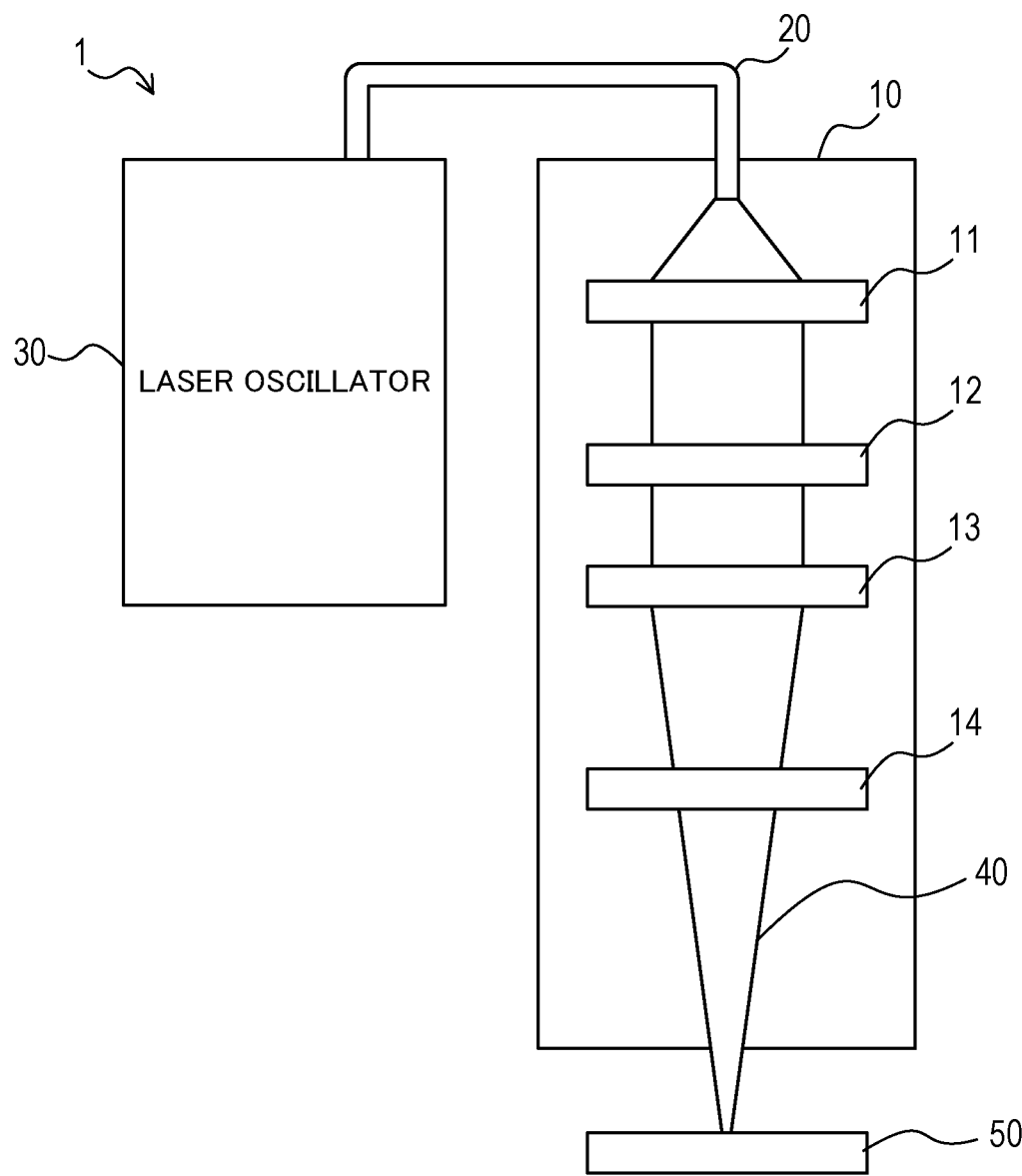
FIG. 1 is a block diagram of a laser welder.

As shown in FIG. 1, a laser welder 1 of the present embodiment comprises a laser oscillator 30, a light path 20, and a processing head 10.

The laser oscillator 30 excites a laser medium and amplifies a light emitted from the excited laser medium in order to generate a laser beam 40.

The light path 20 leads the laser beam 40 generated by the laser oscillator 30 to the processing head 10.

The processing head 10 irradiates the laser beam 40 to a base material 50 to perform a laser welding. The processing head 10 comprises a collimation device 11, a mode setter 12, a focusing lens 13, and a position corrector 14. The processing head 10 may not comprise the position corrector 14.

The collimation device 11 uses, for example, a lens and/or a mirror to adjust an orientation of the led laser beam 40 from the laser oscillator 30.

The mode setter 12 uses a member for changing a path of light, for example, a lens, and/or a DOE (Diffractive Optical Element) to set a mode of the laser beam 40. The mode herein is a distribution pattern of intensity of the laser beam 40 within an irradiation area of the laser beam 40. The intensity of the laser beam 40 may be, for example, an energy density of the laser beam 40. Specifically, a mode of the laser beam 40 is set as the laser beam 40 the orientation of which is adjusted by a collimation device 11 passes through the member such as a lens provided in the mode setter 12.

The focusing lens 13 is a part for adjusting a diaphragm of the laser beam 40 the mode of which is set by the mode setter 12. When the welding is performed, the diaphragm of the laser beam 40 is adjusted so as to be converged immediately before reaching the base material 50.

The position corrector 14 is a part for adjusting a position where the laser beam 40 passing through the focusing lens 13 is irradiated.

2. Laser Welding

Figure 2:
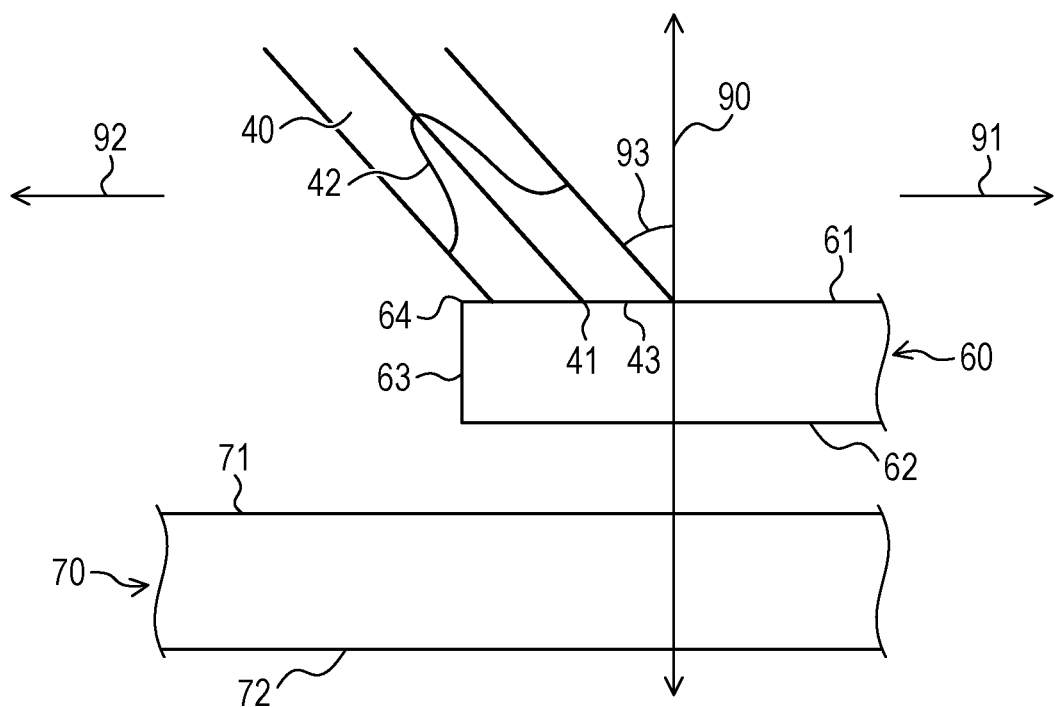
FIG. 2 is an explanatory diagram showing an upper base material and a lower base material laser-welded in a welding process in lateral view.
Figure 3:
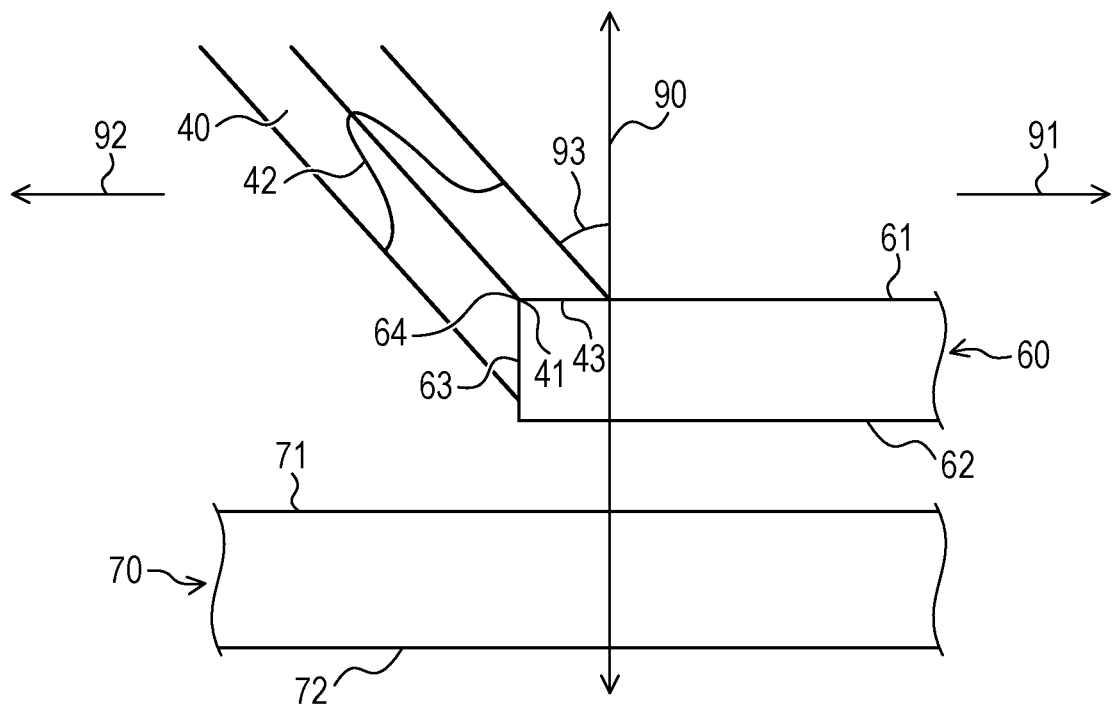
FIG. 3 is another explanatory diagram showing the upper base material and the lower base material laser-welded in the welding process in lateral view.
Figure 4:
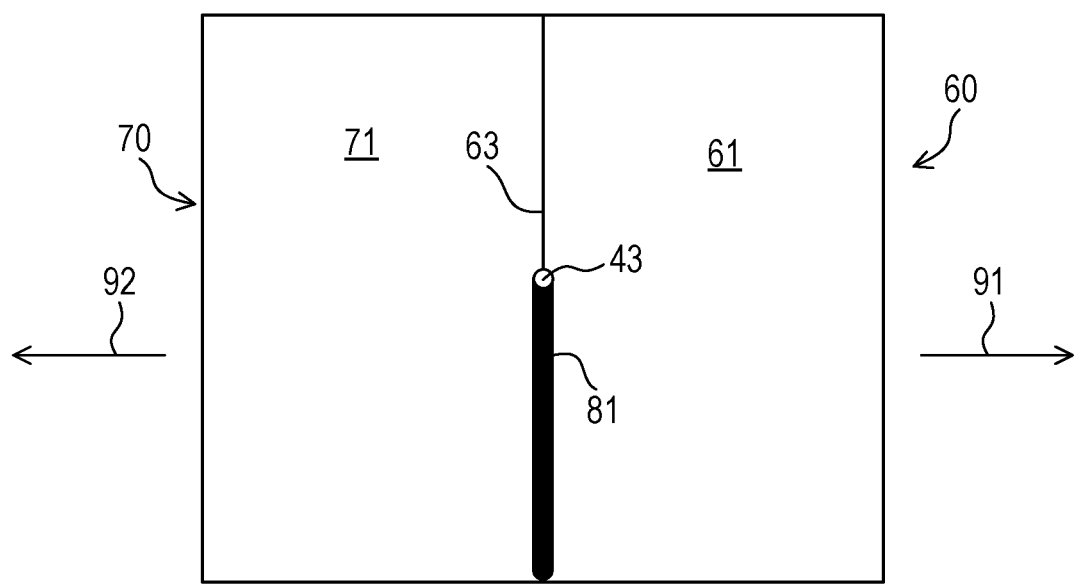
FIG. 4 is an explanatory diagram showing the upper base material and the lower base material laser-welded in the welding process in top view.

In the present embodiment, the laser welder 1 performs a fillet welding to join an upper base material 60 and a lower base material 70 (see FIGS. 2 to 4). A joined body 80, which is a member comprising the upper base material 60 and the lower base material 70, is produced after this performance (see FIG. 5). In the present embodiment, the upper base material 60 and the lower base material 70 are, for example, flat plate members with rectangular shapes. The upper base material 60 and the lower base material 70 may be made from, for example, iron, stainless steel, or aluminum, or may be made from an alloy containing iron, stainless steel, or aluminum. Also, the upper base material 60 and the lower base material 70 may be made from metals other than those described above. Furthermore, the upper base material 60 and the lower base material 70 may be equal or different in thickness.

Hereinafter, surfaces of the upper base material 60 and the lower base material 70, facing one another along a thickness direction, will be respectively upper surfaces 61 and 71, and lower surfaces 62 and 72. A surface of the upper base material 60 positioning between an edge of the upper surface 61 and an edge of the lower surface 62 will be an end surface 63.

The method for manufacturing the joined body 80 according to the present embodiment comprises an arrangement process and a welding process. These processes will be described hereinafter.

3. Arrangement Process

In the arrangement process, the upper base material 60 is disposed above the lower base material 70 (see FIG. 2). At this time, in the upper base material 60 and the lower base material 70, the upper surfaces 61 and 71 are positioned on the upper side, and the lower surfaces 62 and 72 are positioned on the lower side. In other words, the lower surface 62 of the upper base material 60 faces the upper surface 71 of the lower base material 70, and the end surface 63 of the upper base material 60 is elongated along the upper surface 71 of the lower base material 70. Correspondingly, the upper surface 71 of the lower base material 70 is partially covered with the upper base material 60. Also, an angle of the end surface 63 to the upper surface 71 of the lower base material 70 is substantially 90°. However, the angle is not limited to substantially 90° but may be suitably set.

In the present embodiment, by way of examples, the upper base material 60 and the lower base material 70 are arranged with an interspace therebetween. More specifically, for example, the upper base material 60 and the lower base material 70 may be arranged in such a manner that the lower surface 62 of the upper base material 60 and the upper surface 71 of the lower base material 70 have a substantially constantly maintained interspace therebetween. However, the upper base material 60 and the lower base material 70 may be arranged in such a manner that, for example, the lower surface 62 is inclined relative to the upper surface 71, or such a manner that the lower surface 62 and the upper surface 71 are in contact with each other.

Hereinafter, with the end surface 63 of the upper base material 60 as a reference, a side where the upper surface 61 and the lower surface 62 of the upper base material 60 are positioned will be a first side 91, and an opposite side from the first side 91 will be a second side 92. In other words, with the end surface 63 as a reference, a side where a part of the lower base material 70 covered with the upper base material 60 is positioned is the first side 91, and a side where a part of the lower base material 70 not covered with the upper base material 60 is positioned is the second side 92. Also, a direction along which the upper surface 61 and the lower surface 62 of the upper base material 60 are opposing (namely, a thickness direction of the upper base material 60) will be a reference direction 90.

4. Welding Process

The welding process follows the arrangement process. In the welding process, a fillet welding is performed by the laser welder 1 through the laser welding, along the end surface 63 of the upper base material 60, which is previously arranged accordingly in the arrangement process (see FIGS. 2 to 4). In the fillet welding, the end surface 63 of the upper base material 60 is joined with the upper surface 71 of the lower base material 70 arranged relative to the end surface 63 at substantially 90°. However, in the fillet welding, the end surface 63 may be joined with the upper surface 71 arranged relative to the end surface 63 at a degree other than substantially 90°.

Through the fillet welding, the laser beam 40 is so irradiated as to form an initial irradiation area 43 on only the upper surface 61 of the upper base material 60 or on only both the upper surface 61 and the end surface 63 of the upper base material 60. Here, the initial irradiation area 43 is an area irradiated with the laser beam 40 at a time of melting start because of the fillet welding. Specifically, in the fillet welding, when the upper base material 60 newly starts melting because of an irradiation of the laser beam 40, the lower base material 70 is not irradiated with the laser beam 40 but only the upper base material 60 is irradiated with the laser beam 40. After the upper base material 60 is molten because of the irradiation of the laser beam 40, the lower base material 70 is irradiated with the laser beam 40, resulting in melting of the lower base material 70.

FIG. 2 shows the upper base material 60 and the lower base material 70 to which the laser welding is performed, viewed along an extending direction of the end surface 63 of the upper base material 60 in the welding process. As shown in FIG. 2, an irradiation direction of the laser beam 40 is inclined relative to the reference direction 90 so that the laser beam travels toward the first side 91 as the laser beam approaches the upper base material 60. Specifically, a laser light source of the laser beam 40 of the laser welder 1 is disposed on the second side 92 relative to the end surface 63 of the upper base material 60. The laser beam 40 is irradiated from an oblique upside on the upper surface 61 of the upper base material 60. Specifically, an angle 93, which is made by the laser beam 40 and the reference direction 90, is an acute angle.

The laser beam 40 is set in such a manner that a first peak area 41 on which the intensity of the laser beam 40 irradiated is the highest among the irradiation area of the laser beam 40 is formed. A curve 42 shown in FIG. 2 indicates an intensity distribution of the laser beam 40 along a direction toward the first side 91 and the second side 92 from the first peak area 41 within a planar irradiation area perpendicular to the laser beam 40.

As shown by the curve 42, in the present embodiment, by way of examples, the first peak area 41 in form of a point is formed at a position substantially in the middle between an end of the first side 91 and an end of the second side 92 within the irradiation area. It is not limited to the above-described, but the first peak area 41 may be also formed on the first side 91 or the second side 92 relative to the above-described position. Also, the first peak area 41 may not be in form of a point but may have a specific areal extent. As shown by the curve 42, the intensity of the laser beam 40 is lower toward the second side 92 from the first peak area 41 and toward the first side 91 from the first peak area 41.

Figure 6:
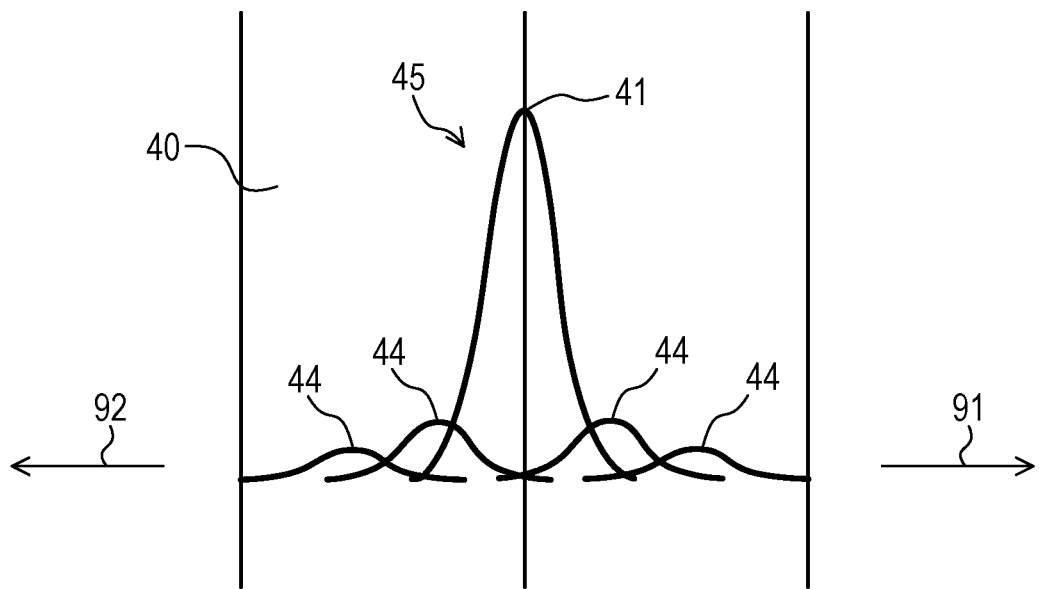
FIG. 6 is a diagram illustrating curves indicating setting values of an intensity distribution of a laser beam along a direction to a first side and a second side from a first peak area within a planar irradiation area perpendicular to the laser beam.

Besides the above-described, the laser beam 40 may be set in such a manner that at least one second peak area 44 is formed on the first side 91 and/or the second side 92 of the first peak area 41 within the planar irradiation area perpendicular to the laser beam 40 (see FIG. 6). The second peak area 44 is an area where the intensity of the laser beam 40 is locally high, and the intensity of the laser beam 40 of the second peak area 44 is lower than that of the first peak area 41.

Figure 7:
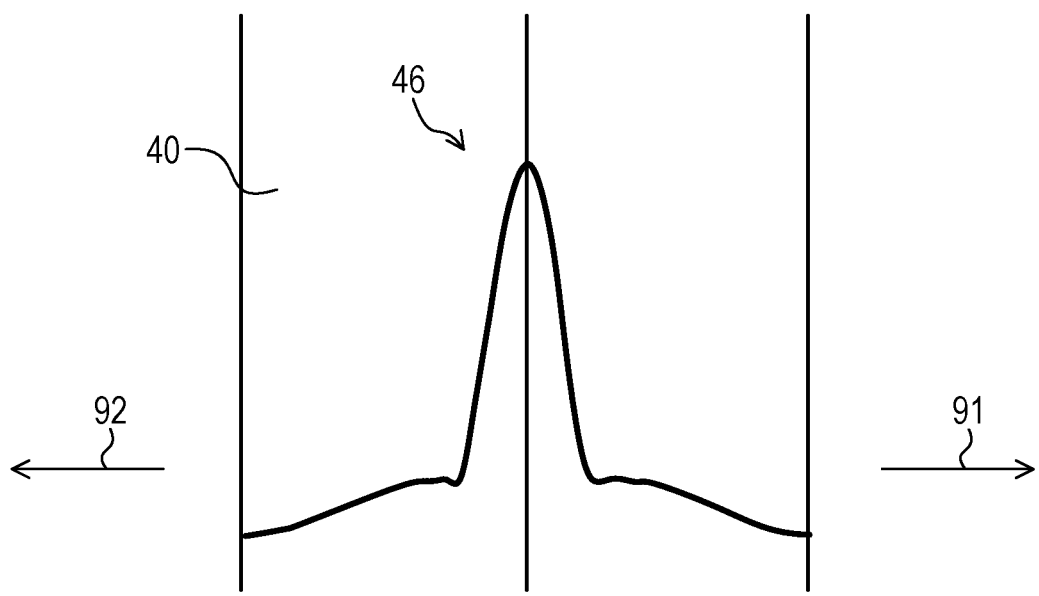
FIG. 7 is a diagram illustrating curves indicating measured values of the intensity distribution of the laser beam along the direction to the first side and the second side from the first peak area within the planar irradiation area perpendicular to the laser beam.

A curve 45 in FIG. 6 indicates setting values of an intensity distribution of the laser beam 40 when two second peak areas 44 are respectively formed on the first side 91 and the second side 92 of the first peak area 41 within the aforementioned irradiation area of the laser beam 40. The intensity of the laser beam 40 may be, for example, set to correspond to the curve 45. A curve 46 in FIG. 7 indicates measured values of an intensity distribution of the laser beam 40 that is set to correspond to the curve 45.

As shown in FIG. 2, in the present embodiment by way of examples, the initial irradiation area 43 of the laser beam 40 is positioned on the upper surface 61 near a boundary 64 between the upper surface 61 and the end surface 63 of the upper base material 60. Specifically, the initial irradiation area 43 is formed at a position on the upper surface 61, which is slightly separated from the boundary 64, or a position on the upper surface 61, which is adjacent to the boundary 64. Meanwhile, the first peak area 41 of the laser beam 40 is positioned on the upper surface 61.

However, it is not limited to the above-mentioned, but the initial irradiation area 43 may also be formed on a position adjacent to the boundary 64 on the upper surface 61 of the upper base material 60. In this case, too, the first peak area 41 of the laser beam 40 is formed on the upper surface 61. Also, the initial irradiation area 43 may be formed on the upper surface 61 and the end surface 63 (see FIG. 3). In such a case, too, it is preferable that the first peak area 41 is formed on the upper surface 61. As shown in FIG. 3, for this case, the first peak area 41 may be formed at the boundary 64. Also, the first peak area 41 may be formed on the end surface 63.

Through the fillet welding in the welding process, for example, the irradiation area on the upper base material 60 (namely, the initial irradiation area 43) is displaced along a path extending in a substantially straight manner (see FIG. 4). However, it is not limited to the above-described, the irradiation area may be, for example, displaced along a curved or bent path.

5. Effects (1) According to the aforementioned embodiment, through the fillet welding in the welding process, when the upper base material starts melting, only the upper surface 61 of the upper base material 60, or only both the upper surface 61 and the end surface 63 of the upper base material 60 are irradiated with the laser beam 40. It enables the upper base material 60 to be sufficiently molten. Furthermore, within the irradiation area of the laser beam 40, the intensity of the laser beam 40 is lower toward the second side 92 from the first peak area 41. Accordingly, the intensity of the laser beam 40 irradiated to or near the end surface 63 of the upper base material 60 is suppressed, resulting in a gradual melting of the area near the end surface 63 of the upper base material 60.

Figure 5:
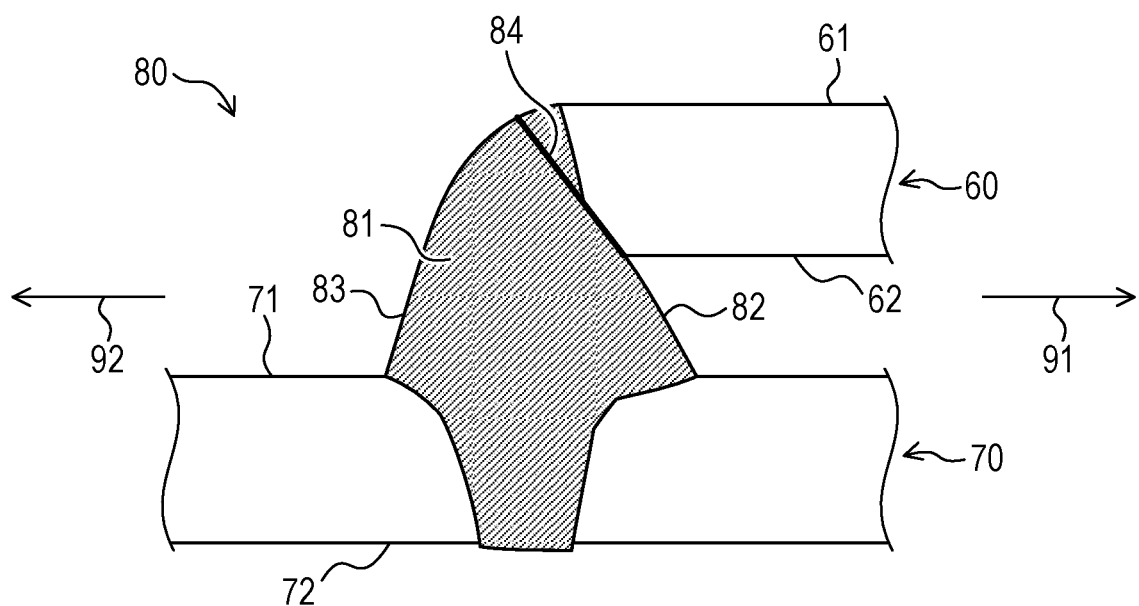
FIG. 5 is a sectional view showing a welding joint of a joined body.

FIG. 5 is a sectional view of a welding joint 81, which is formed in the joined body 80 in the welding process, perpendicular to a movement course of the irradiation area of the laser beam 40. The fillet welding in welding process melts the entire end surface 63 of the upper base material 60 and suitably burns through the upper base material 60. This results in that, as shown in FIG. 5, the welding joint 81 is formed in an area from a top end of the end surface 63 of the upper base material 60 to the upper surface 71 of the lower base material 70, and that a throat depth 84 of the welding joint 81 is increased and the welding strength can be improved.

In the aforementioned embodiment, by way of examples, a shortest distance between an inner lateral surface 82 and an outer lateral surface 83 in the welding joint 81 is defined as a throat depth. The inner lateral surface 82 is a part of the welding joint 81, which faces the interspace between the upper base material 60 and the lower base material 70. Meanwhile, the outer lateral surface 83 is a surface on an opposite side from the inner lateral surface 82 of the welding joint 81 (namely, a surface exposed outside). A length indicated by "84" in the welding joint 81 of FIG. 5 is the throat depth. In the arrangement process, there may be a case that the upper base material 60 and the lower base material 70 are arranged in such a manner that the lower surface 62 and the upper surface 71 are in contact. In such a case, a shortest distance between a part of the welding joint 81 adjacent to the lower surface 62 or the upper surface 71 and the outer lateral surface of the welding joint 81 may be the throat depth.

(2) Furthermore, the laser beam 40 is set in such a manner that the intensity of the laser beam 40 is lower toward the first side 91 from the first peak area 41 within the irradiation area of the laser beam 40. This setting allows a gradual melting of a part of the upper base material 60 located on the first side 91 of the first peak area 41 within the irradiation area of the laser beam 40, resulting in the part suitably burned through. Consequently, the throat depth 84 of the welding joint 81 is increased and the welding strength is improved.

(3) The first peak area 41 of the laser beam 40 is positioned on the upper surface 61 of the upper base material 60, or at the boundary 64 between the upper surface 61 and the end surface 63. This suitably suppresses the intensity of the laser beam 40 irradiated to or near the end surface 63 of the upper base material 60, resulting in a more gradual melting of the area near the end surface 63. Consequently, the upper base material 60 is suitably burned through and therefore the throat depth 84 of the welding joint 81 is increased.

(4) The laser beam 40 may be set in such a manner that at least one second peak area 44 is formed on the first side 91 and/or the second side 92 of the first peak area 41 within the irradiation area of the laser beam 40. This setting allows a more suitable adjustment of the intensity of the laser beam 40 at a part of the upper base material 60 located on the first side 91 and/or the second side 92 of the first peak area 41 within the irradiation area of the laser beam 40. Consequently, the upper base material 60 is molten in a more suitable manner, and therefore the throat depth 84 of the welding joint 81 is increased.

(5) The initial irradiation area 43 of the laser beam 40 may be formed at an area near the boundary 64 on the upper surface 61 of the upper base material 60. In such a case, while the area near the end surface 63 of the upper base material 60 is gradually molten, an amount of the molten upper base material 60 is increased. Consequently, the throat depth 84 of the welding joint 81 is increased, and therefore the welding strength is improved.

(6) Through the fillet welding in the welding process, the irradiation area of the laser beam 40 is displaced along a path extending in a substantially straight manner. Thus, the laser welder 1 can be configured more simply. It also simplifies the welding process, resulting in an improvement of work efficiency.

6. Other Embodiments (1) In the aforementioned embodiment, the upper base material 60 and the lower base material 70 are, for example, rectangle plate-shaped members. However, shapes of the upper base material 60 and the lower base material 70 are not limited to the above-described but may be, for example, curved or bent plate-shaped members. Also, the lower base material 70 may be, for example, a pipe-shaped member, and the upper base material 60 may be joined to an outer circumferential surface of the lower base material 70 by using the method disclosed in the aforementioned embodiment. Furthermore, each of the upper base material 60 and the lower base material 70 may be a part of another member.

(2) A function performed by a single element in the aforementioned embodiments may be achieved by a plurality of elements, or a function performed by a plurality of elements may be achieved by a single element. Also, a part of a configuration in the aforementioned embodiments may be omitted. Further, at least a part of a configuration in one of the aforementioned embodiments may be added to, or may be replaced with, a configuration in another one of the aforementioned embodiments.

What is claimed is:

1. A method for manufacturing a joined body by joining an upper base material and a lower base material through a laser welding, the upper base material comprising an upper surface, a lower surface positioned on an opposite side of the upper surface, and an end surface positioned between an edge of the upper surface and an edge of the lower surface, the method comprising:

disposing the upper base material above the lower base material in such a manner that the lower surface faces the lower base material, and the end surface is elongated along the lower base material; and irradiating a laser beam so as to form an initial irradiation area on only the upper surface of the upper base material or on only both the upper surface and the end surface of the upper base material, whereby the end surface of the upper base material and the lower base material are fillet welded, wherein the initial irradiation area is an area irradiated with the laser beam at a time of melting start because of the fillet welding, wherein a side where the upper surface and the lower surface are positioned is a first side and an opposite side of the first side is a second side, with the end surface as a reference, wherein a direction along which the upper surface and the lower surface of the upper base material are opposing is a reference direction, wherein an irradiation direction of the laser beam is inclined relative to the reference direction so that the laser beam travels toward the first side as the laser beam approaches the upper base material, wherein the laser beam is set in such a manner that a first peak area on which an intensity of the laser beam irradiated is the highest among an irradiation area of the laser beam is formed, and that the intensity of the laser beam is lower toward the second side from the first peak area within the irradiation area of the laser beam, wherein the first peak area of the laser beam is positioned on the upper surface of the upper base material or positioned at a boundary between the upper surface and the end surface, wherein the laser beam is set in such a manner that at least one second peak area is formed within the irradiation area closer to the first side and/or the second side than the first peak area is, and wherein the second peak area is an area in which the intensity of the laser beam is locally high and the intensity of the laser beam in the second peak area is lower than the intensity of the laser beam in the first peak area.

2. The method for manufacturing the joined body according to claim 1, wherein the laser beam is further set in such a manner that the intensity of the laser beam is lower toward the first side from the first peak area within the irradiation area of the laser beam.

3. The method for manufacturing the joined body according to claim 1, wherein the first peak area of the laser beam is formed substantially in the middle between an end of the first side and an end of the second side within the irradiation area of the laser beam.

4. The method for manufacturing the joined body according to claim 1, wherein the upper base material is arranged with an interspace between itself and the lower base material.

5. The method for manufacturing the joined body according to claim 1, wherein the upper base material is a plate-shaped member.

6. The method for manufacturing the joined body according to claim 1, wherein the initial irradiation area of the laser beam is formed at an area near a boundary between the upper surface and the end surface of the upper base material.

7. The method for manufacturing the joined body according to claim 1, wherein the fillet welding is performed by displacing the irradiation area of the laser beam along a path extending in a substantially straight manner.

8. The method for manufacturing the joined body according to claim 3, wherein the laser beam is further set in such a manner that the intensity of the laser beam is lower toward the first side from the first peak area within the irradiation area of the laser beam.

9. The method for manufacturing the joined body according to claim 4, wherein the laser beam is further set in such a manner that the intensity of the laser beam is lower toward the first side from the first peak area within the irradiation area of the laser beam.

10. The method for manufacturing the joined body according to claim 4, wherein the first peak area of the laser beam is formed substantially in the middle between an end of the first side and an end of the second side within the irradiation area of the laser beam.

11. The method for manufacturing the joined body according to claim 9, wherein the first peak area of the laser beam is formed substantially in the middle between an end of the first side and an end of the second side within the irradiation area of the laser beam.

12. A method for manufacturing a joined body by joining an upper base material and a lower base material through a laser welding, the upper base material comprising an upper surface, a lower surface positioned on an opposite side of the upper surface, and an end surface positioned between an edge of the upper surface and an edge of the lower surface, the method comprising:

disposing the upper base material above the lower base material in such a manner that the lower surface faces the lower base material, and the end surface is elongated along the lower base material; and irradiating a laser beam so as to form an initial irradiation area on only the upper surface of the upper base material or on only both the upper surface and the end surface of the upper base material, whereby the end surface of the upper base material and the lower base material are fillet welded, wherein the initial irradiation area is an area irradiated with the laser beam at a time of melting start because of the fillet welding, wherein a side where the upper surface and the lower surface are positioned is a first side and an opposite side of the first side is a second side, with the end surface as a reference, wherein a direction along which the upper surface and the lower surface of the upper base material are opposing is a reference direction, wherein an irradiation direction of the laser beam is inclined relative to the reference direction so that the laser beam travels toward the first side as the laser beam approaches the upper base material, wherein the laser beam is set in such a manner that a first peak area on which an intensity of the laser beam irradiated is the highest among an irradiation area of the laser beam is formed, and that the intensity of the laser beam is lower toward the second side from the first peak area within the irradiation area of the laser beam, wherein the first peak area of the laser beam is positioned on the upper surface of the upper base material or positioned at a boundary between the upper surface and the end surface, and wherein the initial irradiation area of the laser beam is formed at an area near a boundary between the upper surface and the end surface of the upper base material.

13. The method for manufacturing the joined body according to claim 12, wherein the laser beam is further set in such a manner that the intensity of the laser beam is lower toward the first side from the first peak area within the irradiation area of the laser beam.

14. The method for manufacturing the joined body according to claim 12, wherein the first peak area of the laser beam is formed substantially in the middle between an end of the first side and an end of the second side within the irradiation area of the laser beam.

15. The method for manufacturing the joined body according to claim 12, wherein the upper base material is arranged with an interspace between itself and the lower base material.

16. The method for manufacturing the joined body according to claim 12, wherein the upper base material is a plate-shaped member.

17. The method for manufacturing the joined body according to claim 12, wherein the fillet welding is performed by displacing the irradiation area of the laser beam along a path extending in a substantially straight manner.

18. The method for manufacturing the joined body according to claim 14, wherein the laser beam is further set in such a manner that the intensity of the laser beam is lower toward the first side from the first peak area within the irradiation area of the laser beam.

19. The method for manufacturing the joined body according to claim 15, wherein the laser beam is further set in such a manner that the intensity of the laser beam is lower toward the first side from the first peak area within the irradiation area of the laser beam.

20. The method for manufacturing the joined body according to claim 15, wherein the first peak area of the laser beam is formed substantially in the middle between an end of the first side and an end of the second side within the irradiation area of the laser beam.

* * * * *